(12) United States Patent
Ogata et al.

(10) Patent No.: US 10,544,744 B2
(45) Date of Patent: Jan. 28, 2020

(54) ENGINE CONTROL DEVICE (71) Applicant: Hitachi Automotive Systems, Ltd., Hitachinaka-shi, Ibaraki (JP)

(72) Inventors: Kenichiro Ogata, Hitachinaka (JP); Yoshinobu Arihara, Hitachinaka (JP); Hisahiro Ooba, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 86 days.

(21) Appl. No.: 15/752,794

(22) PCT Filed: Jul. 25, 2016

(86) PCT No.: PCT/JP2016/071662
§ 371 (c)(1),
(2) Date: Feb. 14, 2018

(87) PCT Pub. No.: WO2017/033646
PCT Pub. Date: Mar. 2, 2017

(65) Prior Publication Data
US 2018/0363579 A1 Dec. 20, 2018

(30) Foreign Application Priority Data
Aug. 25, 2015 (JP) ................ 2015-165358

(51) Int. Cl.
*F02D 41/02* (2006.01)
*F02D 13/02* (2006.01)
*F02D 15/02* (2006.01)
*F02D 15/04* (2006.01)
*F02D 37/02* (2006.01)
(Continued)

(52) U.S. Cl.
CPC ......... *F02D 41/0255* (2013.01); *F01N 3/101* (2013.01); *F02D 13/0215* (2013.01); *F02D 15/02* (2013.01); *F02D 15/04* (2013.01); *F02D 37/02* (2013.01); *F02D 43/00* (2013.01); *F02D 2700/035* (2013.01)

(58) Field of Classification Search
CPC ...... F02D 13/0215; F02D 15/02; F02D 15/04; F02D 37/02; F02D 41/0255; F02D 43/00; F02D 43/27; F02D 43/035; F02P 5/045; F02P 5/15; F02P 5/1502; Y02T 10/18; Y02T 10/46; F01N 3/101; F01N 3/2006
See application file for complete search history.

(56) References Cited

FOREIGN PATENT DOCUMENTS

| JP | 2007-239555 A | 9/2007 |
|---|---|---|
| JP | 2007-303428 A | 11/2007 |

(Continued)

OTHER PUBLICATIONS

International Search Report (PCT/ISA/210) issued in PCT Application No. PCT/JP2016/071662 dated Nov. 8, 2016 with English translation (five pages).

(Continued)

*Primary Examiner* — Audrey K Bradley
(74) *Attorney, Agent, or Firm* — Crowell & Moring LLP (57) ABSTRACT

Provided is an engine control device that can suppress an increase in PM/PN in an engine that performs a catalyst warm-up mode. To do so, the engine control device according to the present invention synchronously controls ignition timing and an actual compression ratio of the engine in the catalyst warm-up mode.

6 Claims, 10 Drawing Sheets

(51) Int. Cl.
*F02D 43/00* (2006.01)
*F01N 3/10* (2006.01)

(56) References Cited

FOREIGN PATENT DOCUMENTS

| | | |
|---|---|---|
| JP | 2009-74513 A | 4/2009 |
| JP | 2009-79578 A | 4/2009 |
| JP | 2009-215995 A | 9/2009 |
| JP | 2010-185327 A | 8/2010 |
| JP | 2012-132326 A | 7/2012 |
| JP | 2012132326 A * | 7/2012 |
| JP | 2013-56614 A | 3/2013 |
| JP | 5590170 B2 | 9/2014 |

OTHER PUBLICATIONS

Japanese-language Written Opinion (PCT/ISA/237) issued in PCT Application No. PCT/JP2016/071662 dated Nov. 8, 2016 (three pages).
Extended European Search Report issued in counterpart European Application No. 16838993.0 dated Apr. 12, 2019 (eight (8) pages).

* cited by examiner

| DRIVE MODE MD | 0 | 1 | 2 | 3 | 4 |
|---|---|---|---|---|---|
| TARGET IGNITION TIMING TRGIGN | | | BaseIGN map | Retard map | Retard map |
| TARGET INTAKE VALVE CLOSING TIMING TRGIVC | | | BaseIVC map | vCRI map | vCRI map |
| TARGET PISTON STROKE TRGPS | | | BasePS map | sCRI map | sCRI map |
| TARGET EXHAUST VALVE CLOSING TIMING TRGEVC | | | BaseEVC map | BaseEVC map | vERr map |

ENGINE CONTROL DEVICE

TECHNICAL FIELD

The present invention relates to a device that controls an engine mounted on a vehicle, etc.

BACKGROUND ART

Current automobiles are demanded for high efficiency and a clean-up of exhaust in view of environmental protection and energy conservation.

Means for achieving high efficiency includes an improvement in an engine structure by downsizing, a reduction in the number of cylinders, an increase in compression ratio, etc. The downsizing is implemented by a geometrical structure of an engine and thus cannot be changed upon engine operation. The reduction in the number of cylinders and the increase in compression ratio can be changed upon engine operation. The reduction in the number of cylinders can be simulated by the pausing of a cylinder. The compression ratio is calculated with reference to the position of a piston or is calculated with reference to the timing at which an intake valve is closed (i.e., the timing at which a mixture starts to be compressed). In the case of the calculation with reference to the piston position, the compression ratio is calculated by a ratio between a combustion chamber volume for when the piston is at top dead center and a volume in a combustion chamber for when the piston is at bottom dead center. In the case of the calculation with reference to the intake valve closing timing, the compression ratio is calculated by a ratio between a volume in the combustion chamber at the time when the intake valve is closed and a combustion chamber volume for when the piston is at top dead center. Thus, the compression ratio can be made variable by the piston stroke or the intake valve closing timing.

Means for achieving a clean-up of exhaust includes early activation of a catalyst provided in an exhaust manifold. Specifically, a catalyst warm-up mode that increases exhaust temperature by retarding ignition timing after the engine starts is performed. In relation to control to retard the ignition timing, a slightly rich mixture is placed around an ignition plug in order to stabilize combustion. However, there is a possibility of an increase in particulate matter/number (hereinafter, PM/PN) due to a reduction in the temperature in the combustion chamber caused by the presence of the slightly rich mixture and the retard of the ignition timing. Specifically, there is a possibility that fuel that is oxidized at low temperatures may become soot, producing PM/PN.

The following PTL 1 discloses a technique read as "By allowing the valve lift characteristics of a variable valve mechanism upon secondary-air supply to have a predetermined secondary-air lift setting, unburned gas including hydrocarbons (HC), etc., which are emitted to an exhaust passage without being burned in a combustion chamber of an internal-combustion engine can be increased without an air-fuel ratio (combustion A/F) in the combustion chamber becoming significantly rich which is caused by an increase in the amount of fuel. That is, both the suppression of a rich combustion A/F (the achievement of a lean combustion A/F) and the increase in the concentration of HC emitted from the combustion chamber can be achieved. Therefore, by the suppression of a rich combustion A/F, an improvement in fuel efficiency and a reduction in exhaust emissions such as NOx are achieved, and by the increase in the concentration of HC, due to the promotion of afterburning by secondary-air supply, an effect of increasing exhaust temperature increases, enabling to achieve early catalyst activation." (see paragraph 0007).

CITATION LIST

Patent Literature

PTL 1: JP 2010-185327 A

SUMMARY OF INVENTION

Technical Problem

Performing the catalyst warm-up mode in the technique described in the above-described PTL 1 is considered. In PTL 1, the A/F in the combustion chamber is suppressed from becoming rich. However, if the A/F in the combustion chamber is suppressed from becoming rich, then combustion stability deteriorates. This leads to a reduction in the temperature in the combustion chamber, resulting in an increase in PM/PN. Therefore, the effect of the catalyst warm-up mode is not sufficiently exerted.

The present invention is made in view of the above-described problem, and an object of the present invention is to provide an engine control device capable of suppressing an increase in PM/PN in an engine that performs the catalyst warm-up mode.

Solution to Problem

An engine control device according to the present invention synchronously controls ignition timing and an actual compression ratio of an engine in a catalyst warm-up mode.

Advantageous Effects of Invention

According to the engine control device according to the present invention, by controlling both the ignition timing and the actual compression ratio, both the exhaust temperature and the temperature in a combustion chamber can be controlled. By increasing the exhaust temperature, a catalyst is activated, and by increasing the temperature in the combustion chamber, an increase in PM/PN can be suppressed.

DESCRIPTION OF EMBODIMENTS

<Configuration of an Engine Control Device>

The following describes a control device for an engine as an embodiment of the present invention. The engine is assumed to be an automobile engine that includes variable valves and includes mechanisms for making a piston stroke variable.

Figure 1:
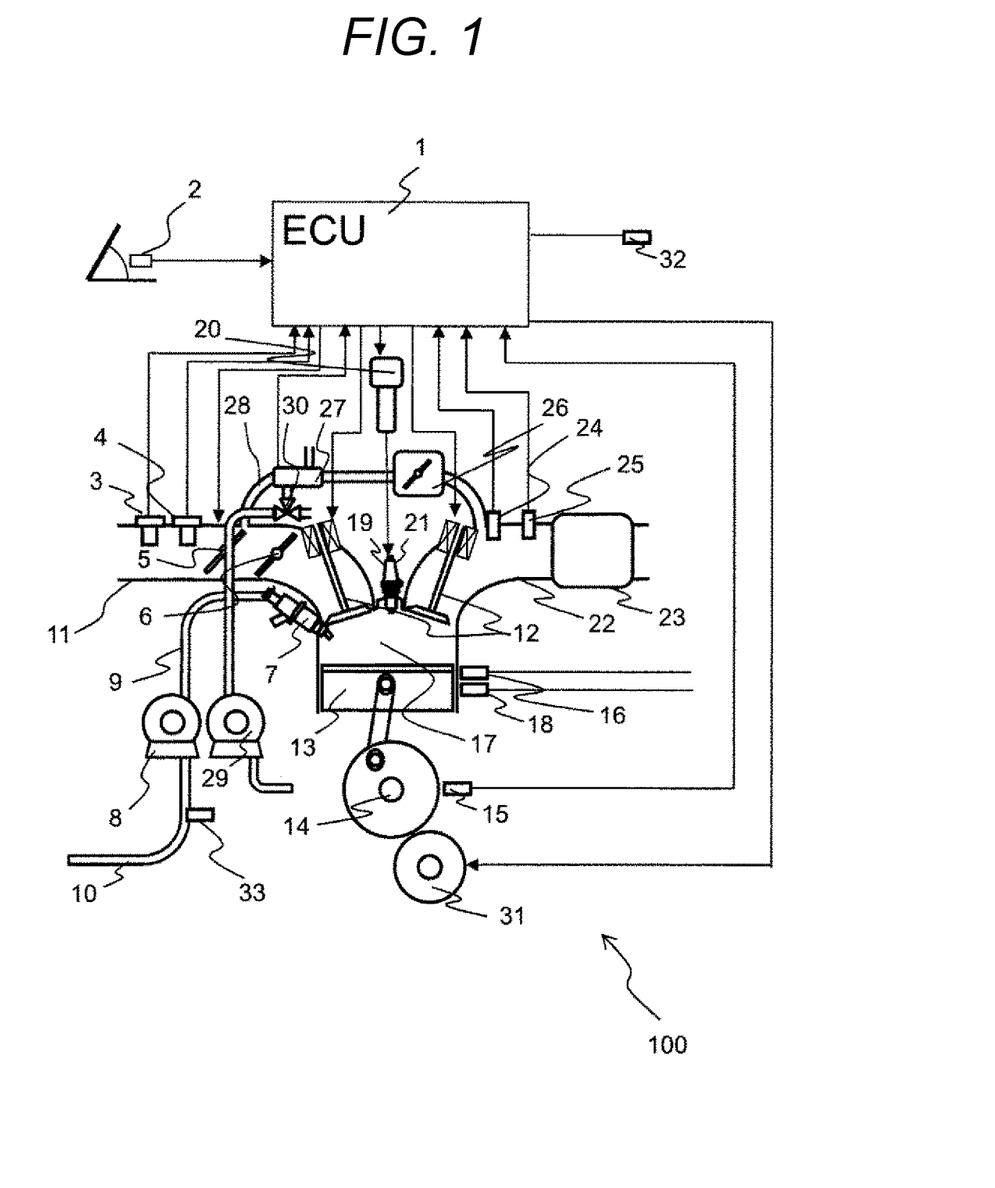
FIG. 1 is a system configuration diagram of an automobile engine system.

FIG. 1 is a system configuration diagram of an automobile engine system according to the present embodiment. An engine 100 is an automobile engine that performs spark-ignition combustion or compression self-ignition combustion. In appropriate positions of an intake manifold 11 there are disposed an air flow sensor 3 that measures the amount of air taken in; a throttle 5 that adjusts intake manifold pressure; an intake air temperature and humidity sensor 4 that measures the temperature and humidity of air taken in; and a tumble flap 6 that makes the area in the intake manifold variable. The air flow sensor 3 may be an intake air pressure sensor.

In appropriate positions of the engine 100 there are provided an injector 7 that injects fuel into a combustion chamber 17; an ignition plug 19 that supplies ignition energy; and variable valves 12 that adjust intake air flowing into the combustion chamber 17 and exhaust to be emitted. The variable valves 12 can make a period during which an intake valve and an exhaust valve are opened or opening/closing timing variable. Only the intake valve may have a variable valve. By changing the timing at which the intake valve is closed, an actual compression ratio can be changed. By this, the pressure and temperature in the combustion chamber can be made variable. The ignition plug 19 is connected to an ignition coil 20, and ignition energy is controlled by the ignition coil 20.

In appropriate positions of the engine 100 there are provided a common rail 9 connected to the injector 7 to supply fuel; a fuel pump 8 for pressure-feeding fuel to the common rail 9; and a fuel pipe 10 that supplies fuel to the fuel pump 8. A fuel pressure sensor 33 that measures the pressure of fuel is provided in an appropriate position of the common rail 9. The fuel pressure sensor 33 may be a fuel temperature sensor.

In appropriate positions of an exhaust manifold 22 there are provided a three-way catalyst 23 that cleans up exhaust; an exhaust temperature sensor 24 that measures the temperature of exhaust on the upstream side of the three-way catalyst 23; an air-fuel ratio sensor 25 that detects the air-fuel ratio of exhaust on the upstream side of the three-way catalyst 23; and an exhaust recirculation pipe 28 connected to the intake manifold 11. The air-fuel ratio sensor 25 may be an oxygen concentration sensor.

In appropriate positions of the exhaust recirculation pipe 28 there are provided an EGR valve 26 that adjusts an exhaust recirculation rate; and an EGR cooler 27 that adjusts the temperature of recirculated gas. The EGR cooler 27 has an inlet and an outlet for cooling water for adjusting the temperature of recirculated gas. The EGR cooler 27 can also operate as a sensor that detects the temperature of recirculated gas. In appropriate positions of the engine 100 there are provided a cooling water pump 29 and a cooling water passage switching valve 30 for controlling the flow rate of cooling water.

A crankshaft 14 is composed of a main shaft and a sub-shaft, and the sub-shaft is connected to a piston 13 through a connecting rod. The engine 100 further includes a control shaft 31 that makes the distance between the main shaft and the sub-shaft or the length of the connecting rod variable. By providing these mechanisms, the amount of stroke of the piston 13 is changed, by which the pressure and temperature in the combustion chamber 17 can be made variable. The mechanisms for making the amount of stroke of the piston 13 variable are not limited to those described above.

The crankshaft 14 is provided with a crank angle sensor 15 for detecting the angle and rotational speed of the crankshaft 14 and the moving speed of the piston 13. The engine 100 further includes a knock sensor 16 for detecting the vibration of the engine 100 as acceleration.

A pressure sensor 21 that detects pressure inside the combustion chamber 17 is provided in an appropriate position of the engine 100. The pressure sensor 21 maybe anion current sensor that detects the amount of ions inside the engine 100. A cooling water temperature sensor 18 that detects the temperature of cooling water inside the engine 100 is provided in an appropriate position of the engine 100.

Detection signals outputted from the air flow sensor 3, the intake air temperature and humidity sensor 4, the crank angle sensor 15, the knock sensor 16, the cooling water temperature sensor 18, the pressure sensor 21, the exhaust temperature sensor 24, the air-fuel ratio sensor 25, and the EGR cooler 27 are sent to an ECU 1.

An accelerator pedal position sensor 2 detects the amount of depression of an accelerator pedal, i.e., an accelerator pedal position. A detection signal outputted from the accelerator pedal position sensor 2 is sent to the ECU 1. The ECU 1 computes required torque based on the signal outputted from the accelerator pedal position sensor 2. Namely, the accelerator pedal position sensor 2 is used as a required-torque detection sensor that detects required torque for the engine 100.

The ECU 1 computes the angle and rotational speed of the crankshaft 14 and the moving speed of the piston 13, based on the signal outputted from the crank angle sensor 15. The ECU 1 suitably computes the amounts of operation of the main functional units of the engine 100, such as a position of the throttle 5, a position of the tumble flap 6, an injection signal for the injector 7, a drive signal for the fuel pump 8, valve opening/closing timing of the variable valves 12, an ignition control signal for the ignition coil 20, a position of the EGR valve 26, a cooling water switching valve drive signal for the cooling water pump 29, and a control signal for the control shaft 31 that controls the amount of piston stroke, based on the operating conditions of the engine 100 obtained from the outputs from the respective sensors.

The position of the throttle 5 computed by the ECU 1 is sent to the throttle 5 as a throttle drive signal. The position of the tumble flap 6 computed by the ECU 1 is sent to the tumble flap 6 as a tumble flap drive signal. The injection signal for the injector 7 computed by the ECU 1 is converted to an injector open-valve pulse signal, and the injector open-valve pulse signal is sent to the injector 7. The drive signal for the fuel pump 8 computed by the ECU 1 is sent to the fuel pump 8. The valve opening/closing timing of the variable valves 12 computed by the ECU 1 is sent to the variable valves 12 as a variable valve drive signal. The ignition control signal computed by the ECU 1 is sent to the ignition coil 20 as an ignition control signal that gives an instruction to perform ignition once or a plurality of times such that ignition is performed at ignition timing computed by the ECU 1. The position of the EGR valve 26 computed by the ECU 1 is sent to the EGR valve 26 as an EGR valve drive signal. The cooling water switching valve control signal computed by the ECU 1 is sent to the cooling water pump 29 and the cooling water passage switching valve 30.

Fuel is injected into a mixture of air that flows into the combustion chamber 17 from the intake manifold 11 through the intake valve and recirculated gas that is recirculated from the exhaust manifold 22 through the EGR valve 26 and the EGR cooler 27, by which a combustible mixture is formed. The combustible mixture explodes by a spark generated by the ignition plug 19 to which ignition energy is supplied from the ignition coil 20 at predetermined ignition timing, and the piston 13 is pressed down by combustion pressure resulting from the explosion, which becomes the driving force of the engine 100. Exhaust after the explosion is sent to the three-way catalyst 23 through the exhaust manifold 22. Exhaust components are cleaned up in the three-way catalyst 23 and then emitted.

A target piston stroke signal computed by the ECU 1 is sent to the control shaft 31. The engine 100 is mounted on an automobile, and the ECU 1 receives information about a traveling state of the automobile. The ECU 1 can also receive detection signals from, for example, (a) a vehicle speed sensor attached to a car body having mounted thereon the engine 100 or to a wheel, (b) a sensor that measures the acceleration or angle of the car body (hereinafter, a G-sensor 32), and (c) a shift lever position sensor that detects the position of a shift lever for controlling a transmission which is attached to the car body having mounted thereon the engine 100, directly or through other control devices.

The ECU 1 can determine, for example, whether the car body is placed on the flat ground or a slope, using a detection signal from the G-sensor 32. In addition, a determination as to whether to perform a catalyst warm-up mode can be made using a detection signal from the cooling water temperature sensor 18. For example, when the cooling water temperature is higher than an appropriate threshold value, it can be determined that there is no need to perform the catalyst warm-up mode.

Figure 2:
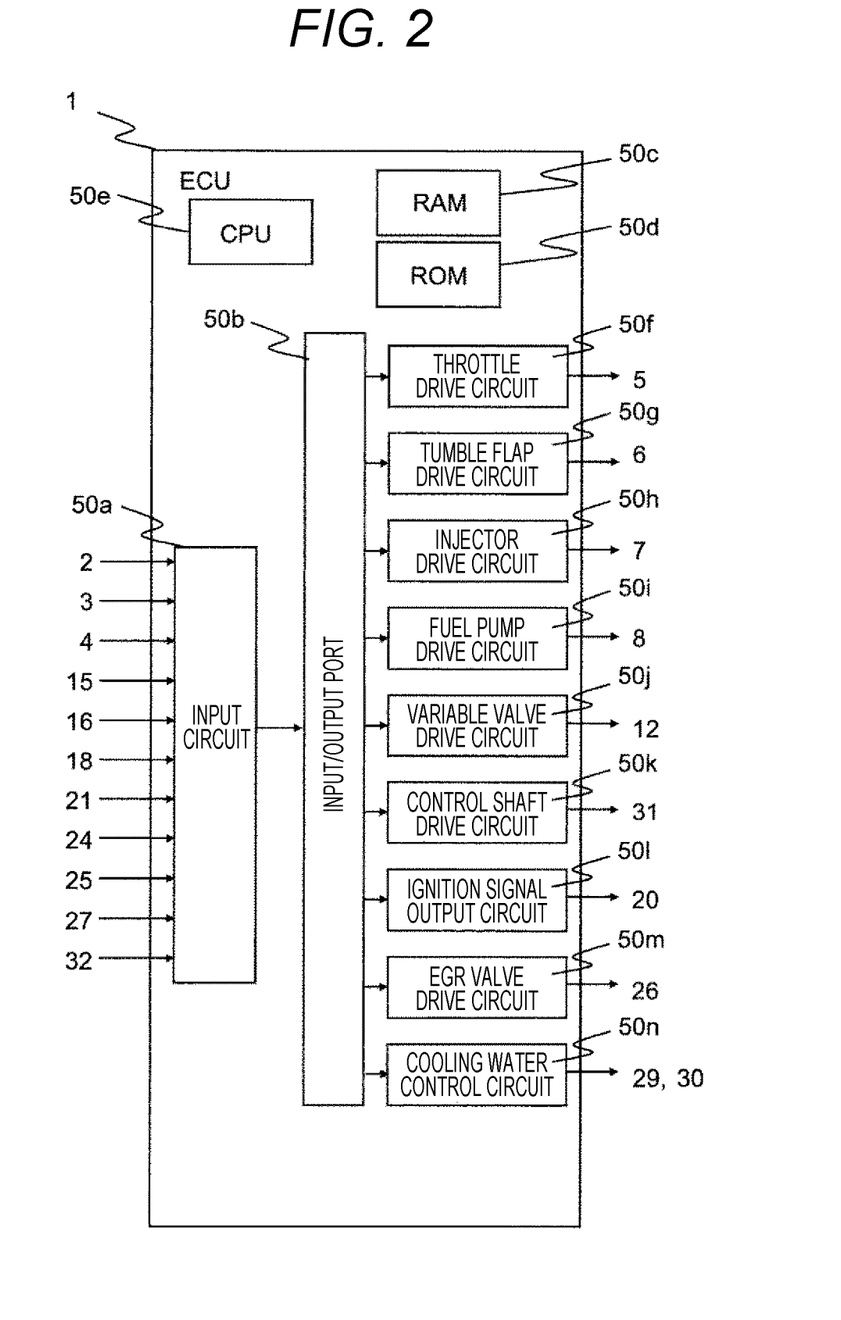
FIG. 2 is a system block diagram showing a configuration of an ECU 1.

FIG. 2 is a system block diagram showing a configuration of the ECU 1. Output signals from the accelerator pedal position sensor 2, the air flow sensor 3, the intake air temperature and humidity sensor 4, the crank angle sensor 15, the knock sensor 16, the cooling water temperature sensor 18, the pressure sensor 21, the exhaust temperature sensor 24, the air-fuel ratio sensor 25, the EGR cooler 27 (recirculated gas temperature detector), the G-sensor 32, etc., are inputted to an input circuit 50*a* of the ECU 1. The inputted signal from each sensor is sent to an input/output port 50*b*.

The signal sent to the input/output port 50*b* is stored as a signal value in a RAM 50*c*, and a CPU 50*e* performs arithmetic processing using the signal value. A control program that describes the content of arithmetic processing performed by the CPU 50*e* is stored in advance in a ROM 50*d*. A value indicating the amount of operation of each actuator that is computed according to the control program is stored in the RAM 50*c*, and is then sent to the actuator through the input/output port 50*b* and a corresponding drive circuit. Although the following may describe the control program as the subject of operation for convenience of description, the CPU 50*e* is the one that actually executes the control program.

In the present embodiment, the ECU 1 includes the following drive circuits: a throttle drive circuit 50*f*; a tumble flap drive circuit 50*g*; an injector drive circuit 50*h*; a fuel pump drive circuit 50*i*; a variable valve drive circuit 50*j*; a control shaft drive circuit 50*k*; an ignition signal output circuit 50*l*; an EGR valve drive circuit 50*m*; and a cooling water control circuit 50*n*. The drive circuits respectively control the following: the throttle 5; the tumble flap 6; the injector 7; the fuel pump 8; the variable valves 12; the control shaft 31; the ignition coil 20; the EGR valve 26; and the cooling water pump 29 and the cooling water passage switching valve 30. Although in the present embodiment these drive circuits are provided in the ECU 1, the configuration is not limited thereto, and any of the drive circuits may be provided external to the ECU 1.

Figure 3A:
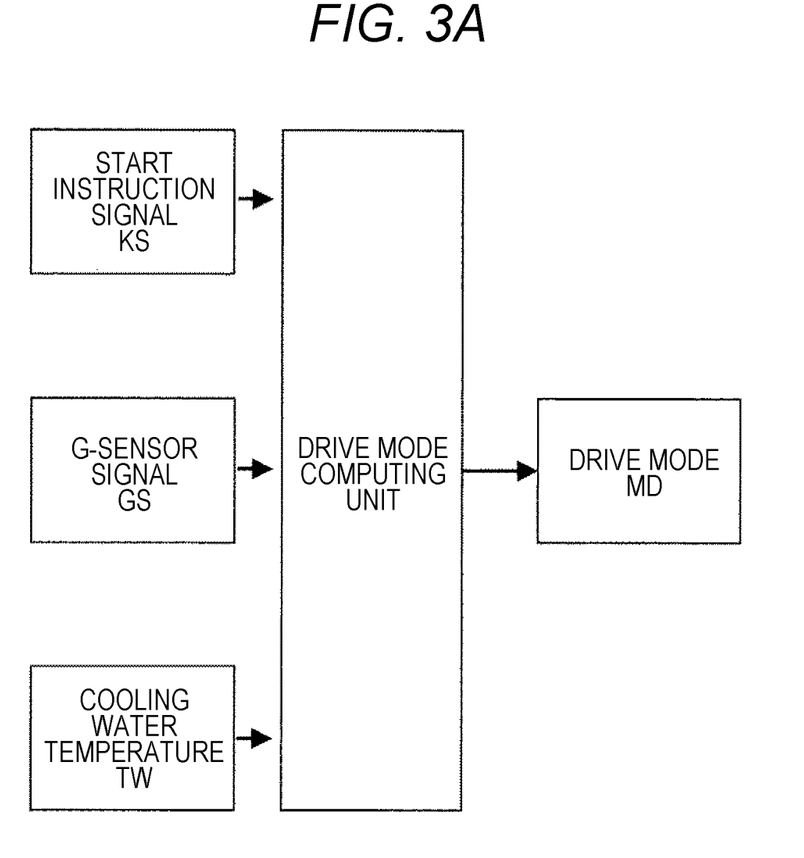
FIG. 3A is a computing logic diagram that describes a procedure of computation of a vehicle's drive mode by a CPU 50e.

FIG. 3A is a computing logic diagram that describes a procedure of computation of a vehicle's drive mode by the CPU 50*e*. The control program executed by the CPU 50*e* includes a drive mode computing unit as a control block. A start instruction signal KS, a G-sensor signal GS, and a cooling water temperature TW are inputted to the drive mode computing unit, and the drive mode computing unit computes and outputs a drive mode MD based on the input signals.

Figure 3B:
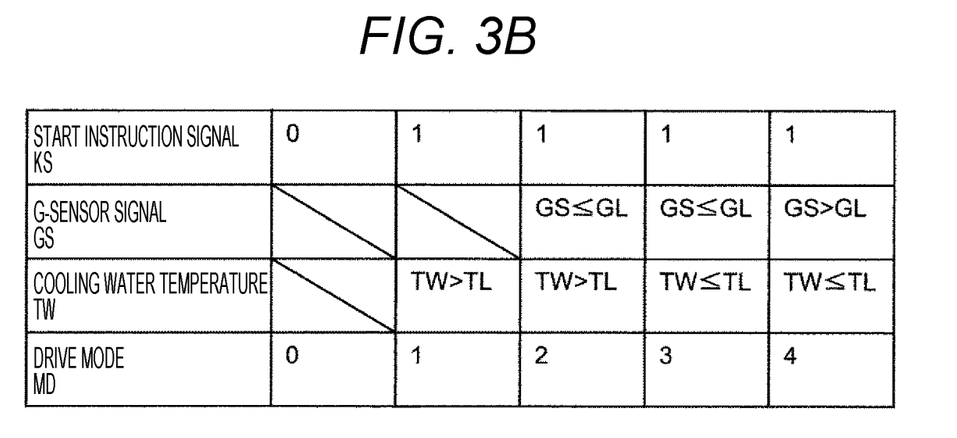
FIG. 3B is a drive mode determination table which is used when the CPU 50e computes a drive mode MD.

FIG. 3B is a drive mode determination table which is used when the CPU 50*e* computes a drive mode MD. When the start instruction signal KS is 0, the drive mode MD is 0 without referring to the G-sensor signal GS and the cooling water temperature TW. When the start instruction signal KS is 1, the G-sensor signal GS is greater than a G-sensor signal limit GL (i.e., the car body is placed on a strongly inclined slope), and the cooling water temperature TW is lower than or equal to a cooling water temperature limit TL, the drive mode MD is 4. When the start instruction signal KS is 1, the G-sensor signal GS is less than or equal to the G-sensor signal limit GL, and the cooling water temperature TW is lower than or equal to the cooling water temperature limit TL, the drive mode MD is 3. When the start instruction signal KS is 1, the G-sensor signal GS is less than or equal to the G-sensor signal limit GL, and the cooling water temperature TW is higher than the cooling water temperature limit TL, the drive mode MD is 2. When the start instruction signal KS is 1 and the cooling water temperature TW is higher than the cooling water temperature limit TL, the drive mode MD is 1.

Figure 4A:
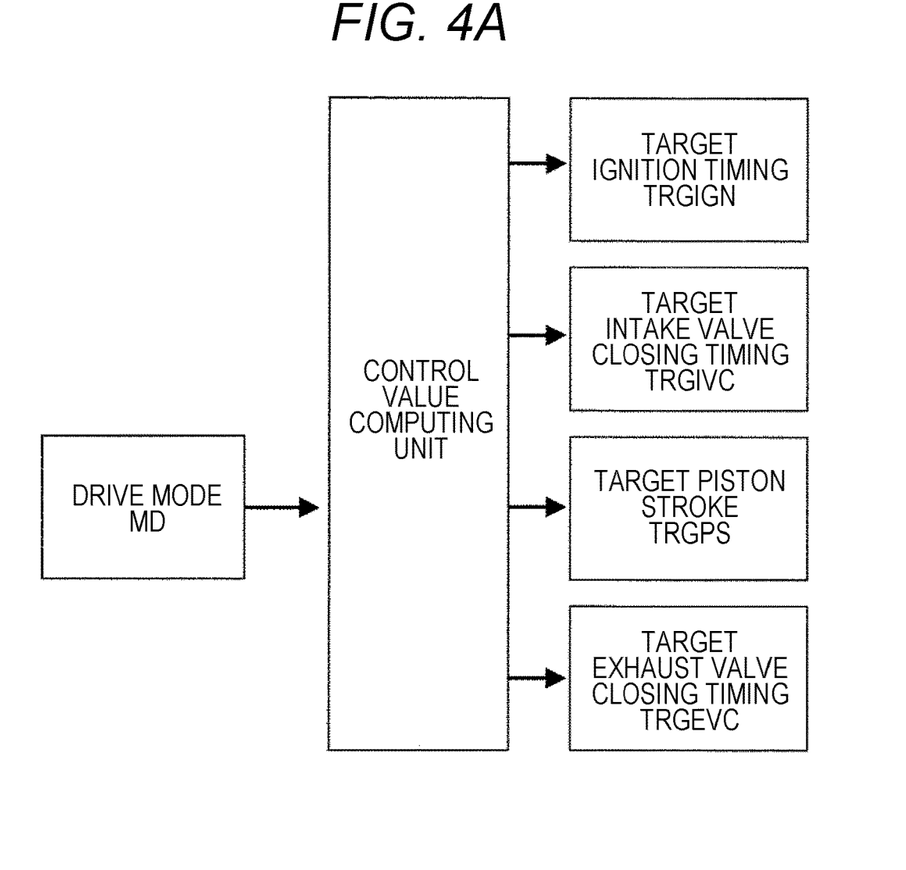
FIG. 4A is a computing logic diagram that describes a procedure of computation of control values by the CPU 50e.

FIG. 4A is a computing logic diagram that describes a procedure of computation of control values by the CPU 50*e*. The control program executed by the CPU 50*e* includes a control value computing unit as a control block. A drive mode MD is inputted to the control value computing unit, and the control value computing unit computes and outputs the following control values according to the drive mode MD: target ignition timing TRGIGN; target intake valve closing timing TRGIVC; a target piston stroke TRGPS; and target exhaust valve closing timing TRGEVC.

Figure 4B:
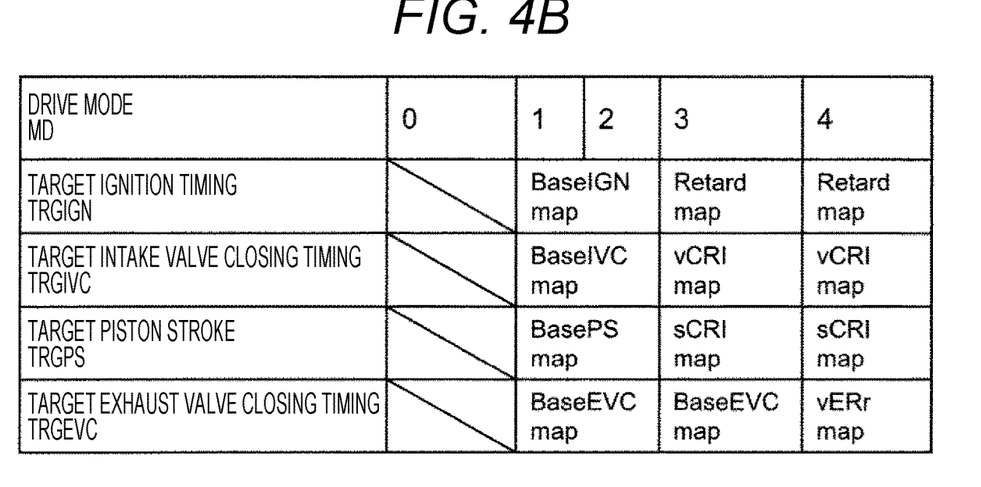
FIG. 4B is a selection table indicating control maps which are used when a control value computing unit computes each control value.

FIG. 4B is a selection table showing control maps which are used when the control value computing unit computes each control value. The control value computing unit selects control maps (described later) associated with the value of a drive mode MD. Each control map is data defining a correspondence relationship between engine speed NE, target torque TRGTRQ, and each control value. The control value computing unit can obtain each control value by referring to the control maps associated with the drive mode MD.

When the drive mode MD is 0, the control value computing unit does not refer to any of the maps. When the drive mode MD is 1 or 2, the control value computing unit obtains target ignition timing TRGIGN, target intake valve closing timing TRGIVC, a target piston stroke TRGPS, and target exhaust valve closing timing TRGEVC by referring to a BaseIGN map, a BaseIVC map, a BasePS map, and a BaseEVC map, respectively. When the drive mode MD is 3, the control value computing unit obtains target ignition timing TRGIGN by referring to a Retard map, obtains target intake valve closing timing TRGIVC by referring to a vCRI map, obtains a target piston stroke TRGPS by referring to an sCRI map, and obtains target exhaust valve closing timing TRGEVC by referring to the BaseEVC map. When the drive mode MD is 4, the control value computing unit obtains target ignition timing TRGIGN by referring to the Retard map, obtains target intake valve closing timing TRGIVC by referring to the vCRI map, obtains a target piston stroke TRGPS by referring to the sCRI map, and obtains target exhaust valve closing timing TRGEVC by referring to a vERr map.

Figure 5:
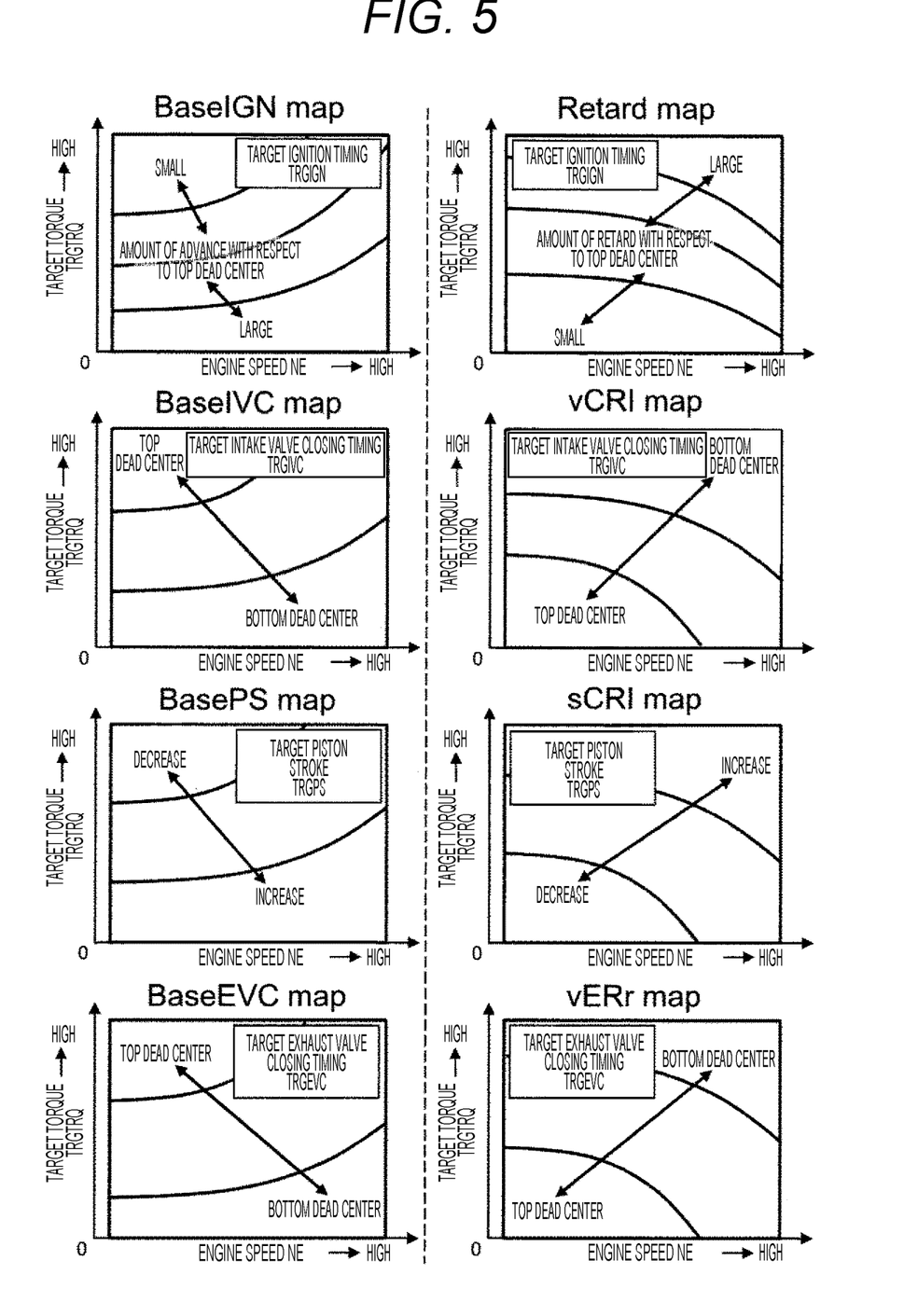
FIG. 5 is characteristic diagrams of the respective control maps.

FIG. 5 is characteristic diagrams of the respective control maps. Graphs in the left column of the drawing are characteristic diagrams of control maps (Base maps) that are used when there is no need to perform the catalyst warm-up mode. Graphs in the right column of the drawing are characteristic diagrams of control maps that are used when there is a need to perform the catalyst warm-up mode. A vertical axis of each characteristic diagram is the target torque TRGTRQ, and a horizontal axis is the engine speed NE. The target torque TRGTRQ can be set according to required torque which is obtained based on the accelerator pedal position sensor 2. The engine speed NE can be computed based on, for example, a detection signal of the crank angle sensor 15.

In the BaseIGN map, with an increase in the target torque TRGTRQ and a decrease in the engine speed NE, the amount of advance of the target ignition timing TRGIGN with respect to top dead center decreases. In the BaseIVC map, with an increase in the target torque TRGTRQ and a decrease in the engine speed NE, the target intake valve closing timing TRGIVC approaches top dead center. In the BasePS map, with an increase in the target torque TRGTRQ and a decrease in the engine speed NE, the target piston stroke TRGPS decreases. In the BaseEVC map, with an increase in the target torque TRGTRQ and a decrease in the engine speed NE, the target exhaust valve closing timing TRGEVC approaches top dead center.

By using the above-described characteristics, the occurrence of abnormal combustion which results from an increase in combustion speed caused by an increase in the temperature in the combustion chamber 17 due to an increase in the target torque TRGTRQ can be avoided, and abnormal combustion caused by the combustion speed increasing relative to the piston speed due to a decrease in the engine speed NE can be avoided.

In the Retard map, with an increase in the target torque TRGTRQ and an increase in the engine speed NE, the amount of retard of the target ignition timing TRGIGN with respect to top dead center increases. In the vCRI map, with an increase in the target torque TRGTRQ and an increase in the engine speed NE, the target intake valve closing timing TRGIVC approaches bottom dead center. In the sCRI map, with an increase in the target torque TRGTRQ and an increase in the engine speed NE, the target piston stroke TRGPS increases. In the vERr map, with an increase in the target torque TRGTRQ and an increase in the engine speed NE, the target exhaust valve closing timing TRGEVC approaches bottom dead center.

With an increase in combustion speed caused by an increase in the temperature in the combustion chamber 17 due to an increase in the target torque TRGTRQ and an increase in the engine speed NE, there is a possibility that the engine may unnecessarily rev up. By using the above-described characteristics, (a) the ignition timing is retarded, (b) the intake valve closing timing is brought close to bottom dead center, (c) the actual compression ratio is increased by an increase in piston stroke, and (d) the expansion ratio is decreased by bringing the exhaust valve closing timing close to bottom dead center. Thus, the unnecessary revving up can be suppressed. Namely, when there is a need to perform the catalyst warm-up mode, by retarding the ignition timing, the exhaust temperature is increased and the temperature in the combustion chamber 17 is increased while suppressing unnecessary revving up, enabling to suppress the production of PM/PN.

When the drive mode MD is 4, i.e., when it is determined based on the G-sensor signal GS that the vehicle is placed on a slope and it is determined based on the cooling water temperature that there is a need to perform the catalyst warm-up mode, by using the control maps in the right column of FIG. 5, the target ignition timing TRGIGN is retarded, the target intake valve closing timing TRGIVC and the target piston stroke TRGPS are controlled in a direction in which the actual compression ratio increases, and the target exhaust valve closing timing TRGEVC is controlled in a direction in which the target exhaust valve closing timing TRGEVC moves away from top dead center.

When the drive mode MD is 3, i.e., when it is determined based on the G-sensor signal GS that the vehicle is not placed on a slope and it is determined based on the cooling water temperature that there is a need to perform the catalyst warm-up mode, by using the control maps in the left column of FIG. 5, the target ignition timing TRGIGN is retarded, and the target intake valve closing timing TRGIVC and the target piston stroke TRGPS are controlled in a direction in which the actual compression ratio increases.

When the drive mode MD is 1 or 2, i.e., when it is determined based on the cooling water temperature that there is no need to perform the catalyst warm-up mode, each control value is computed using the Base maps.

Figure 6:
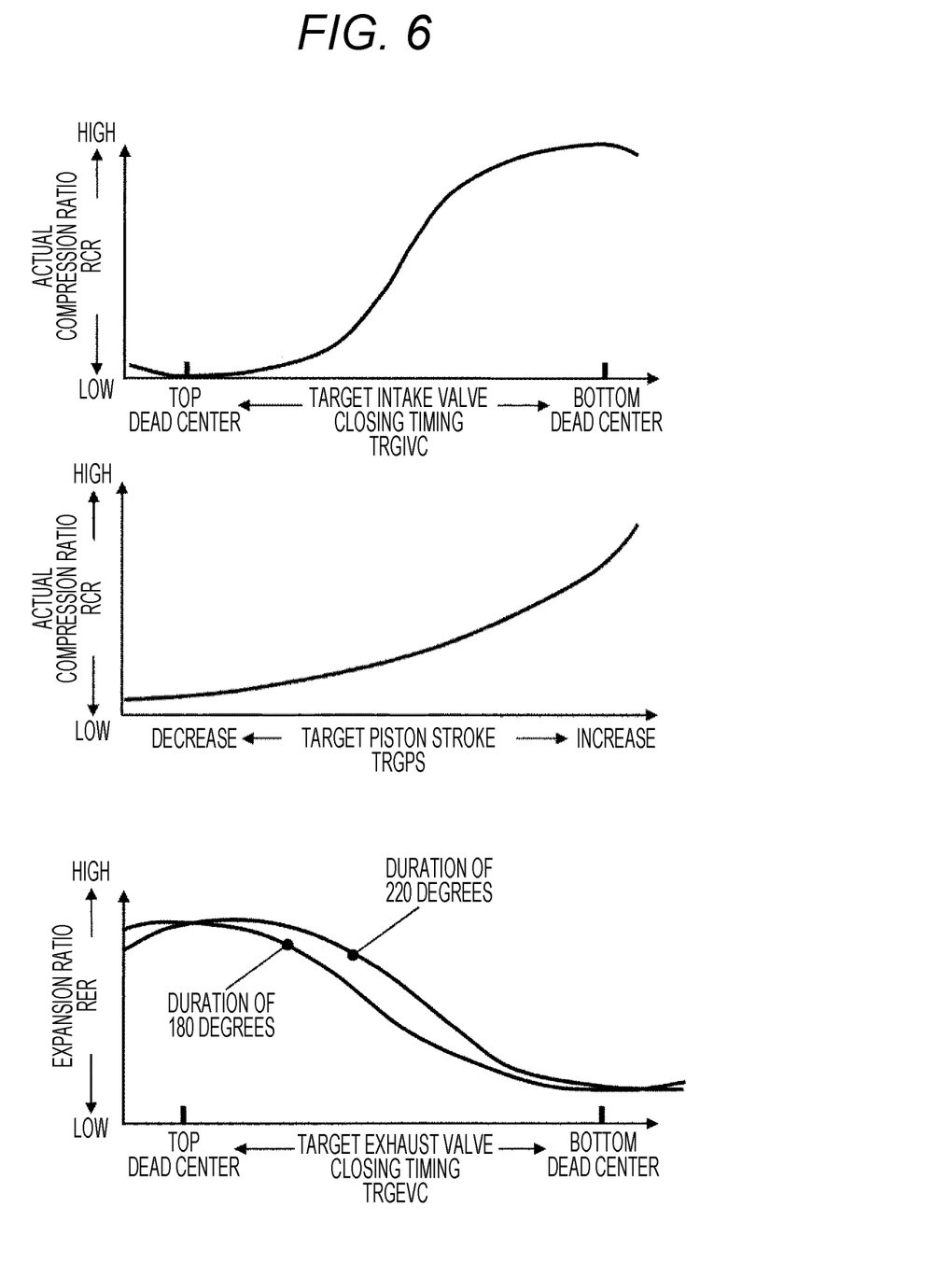
FIG. 6 is characteristic diagrams of changes in an actual compression ratio and an expansion ratio due to a change in each target value.

FIG. 6 is characteristic diagrams of changes in the actual compression ratio and the expansion ratio due to a change in each target value. The top diagram is a characteristic diagram showing changes in the actual compression ratio RCR due to a change in the target intake valve closing timing TRGIVC. The actual compression ratio RCR increases as the target intake valve closing timing TRGIVC gets closer to bottom dead center. The middle diagram is a characteristic diagram showing changes in the actual compression ratio RCR due to a change in the target piston stroke TRGPS. The actual compression ratio RCR increases as the target piston stroke TRGPS increases. The bottom diagram is a characteristic diagram showing changes in the expansion ratio RER due to a change in the target exhaust valve closing timing TRGEVC. When a period during which the exhaust valve is opened (hereinafter, duration) is 180 degrees, the expansion ratio reaches its maximum at target exhaust value closing timing TRGEVC being at top dead center. When the duration is 220 degrees, target exhaust valve closing timing TRGEVC at which the maximum expansion ratio is obtained is retarded from top dead center.

An automobile including the engine control device according to the present invention has means (G-sensor 32) for determining the inclination angle of the vehicle with respect to a road surface. When it is determined that the inclination angle is greater than or equal to a predetermined value, in the catalyst warm-up mode the amount of retard of ignition timing with respect to top dead center is increased, along with which it is desirable to bring the intake valve closing timing of the variable valves 12 close to bottom dead center. Furthermore, it is desirable to move the exhaust valve closing timing away from top dead center so that the expansion ratio decreases under circumstances where the duration is constant. The decrease in the expansion ratio increases the exhaust temperature, and thus, the catalyst can be activated more. Furthermore, by bringing the intake valve closing timing of the variable valves 12 close to bottom dead center in accordance with the increase in the amount of retard of the ignition timing, while the actual compression ratio RCR is increased, the scavenging properties of residue gas in the combustion chamber 17 are improved at the same time, enabling to increase a negative pressure generated by the engine 100. Namely, in a configuration in which a braking system uses an engine negative pressure, when the inclination angle is large and the braking system requires a larger engine negative pressure, the operation of the braking system can be effectively assisted.

Figure 7:
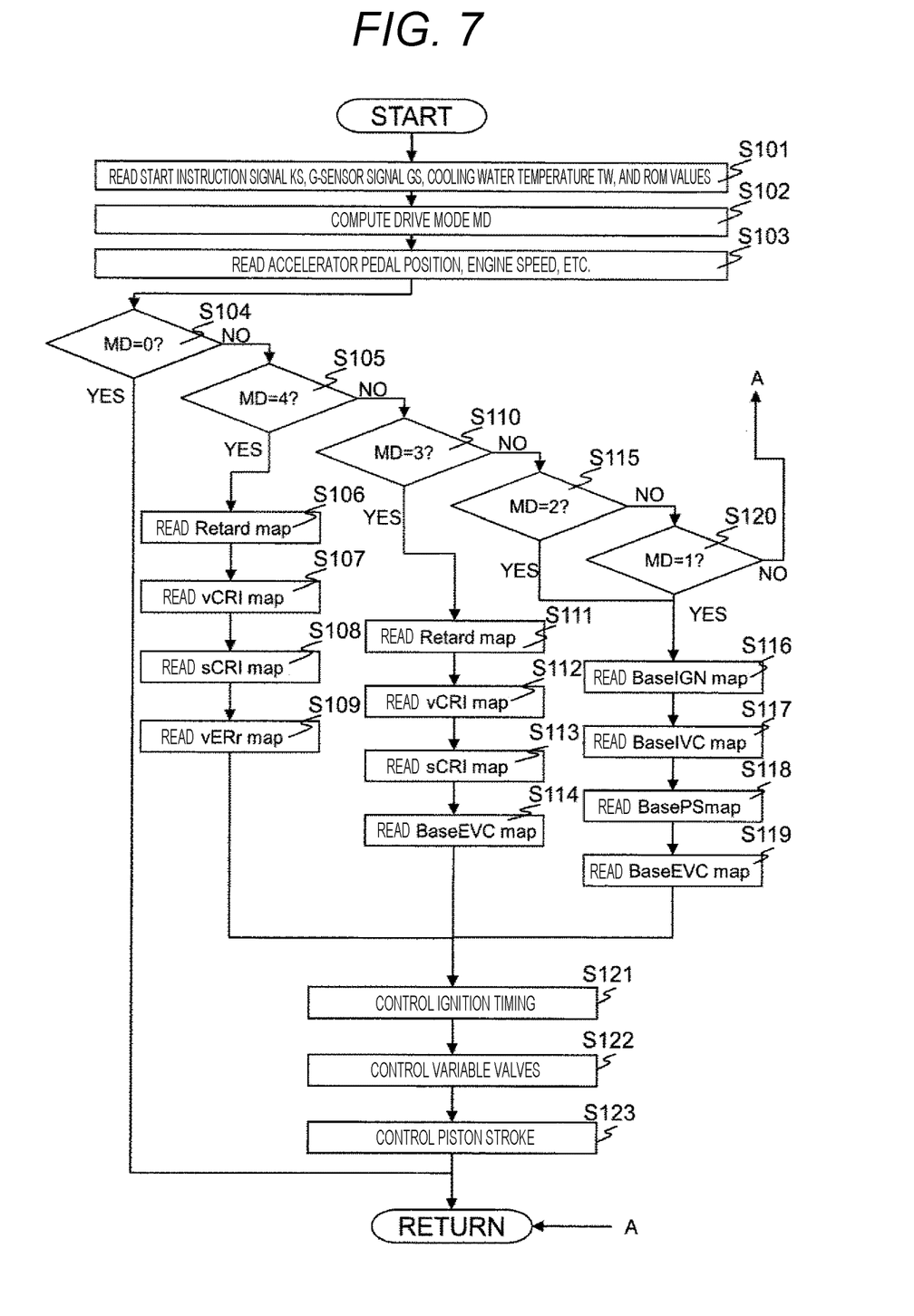
FIG. 7 is a flowchart describing control computation which is performed by the CPU 50e.

FIG. 7 is a flowchart describing control computation which is performed by the CPU 50e. The CPU 50e repeatedly performs control computation which is described in FIGS. 3A to 4B, for example, in a predetermined cycle. Each step of FIG. 7 will be described below.

(FIG. 7: Step S101 to S102)

The CPU 50e receives signals such as a start instruction signal KS, a G-sensor signal GS, and a cooling water temperature TW, and reads values written in the ROM 50d (S101). The CPU 50e computes a drive mode MD according to the signals, etc. (S102). These steps correspond to a computation block described in FIGS. 3A and 3B.

(FIG. 7: Step S103)

The CPU 50e reads an accelerator pedal position sensor signal APS, an engine speed NE, a crank angle sensor signal, etc. The CPU 50e computes target torque TRGTRQ based on the accelerator pedal position sensor signal APS.

(FIG. 7: Step S104)

The CPU 50e determines whether the drive mode MD computed at step S102 is 0. If 0, the flowchart ends, and if not 0, processing proceeds to step S105.

(FIG. 7: Step S105)

The CPU 50e determines whether the drive mode MD is 4. If 4, processing proceeds to step S106, and if not 4, processing proceeds to step S110.

(FIG. 7: Step S106 to S109)

The CPU 50e obtains each control value by referring to the Retard map (S106), vCRI map (S107), sCRI map (S108), and vERr map (S109) which are described in FIG. 5, using the target torque TRGTRQ and engine speed NE which are read at step S103, as keys. After obtaining the control values, processing proceeds to step S121.

(FIG. 7: Step S110)

The CPU 50e determines whether the drive mode MD is 3. If 3, processing proceeds to step S111, and if not 3, processing proceeds to step S115.

(FIG. 7: Step S111 to S114)

The CPU 50e obtains each control value by referring to the Retard map (S111), vCRI map (S112), sCRI map (S113), and BaseEVC map (S114) which are described in FIG. 5, using the target torque TRGTRQ and engine speed NE which are read at step S103, as keys. After obtaining the control values, processing proceeds to step S121.

(FIG. 7: Step S115)

The CPU 50e determines whether the drive mode MD is 2. If 2, processing proceeds to step S116, and if not 2, processing proceeds to step S120.

(FIG. 7: Step S116 to S119)

The CPU 50e obtains each control value by referring to the BaseIGN map (S116), BaseIVC map (S117), BasePS map (S118), and BaseEVC map (S119) which are described in FIG. 5, using the target torque TRGTRQ and engine speed NE which are read at step S103, as keys. After obtaining the control values, processing proceeds to step S121.

(FIG. 7: Step S120)

The CPU 50e determines whether the drive mode MD is 1. If 1, processing proceeds to step S116, and if not 1, the flowchart ends.

(FIG. 7: Step S121 to S123)

The CPU 50e performs ignition timing control (S121), variable valve control (S122), and piston stroke control (S123) using the control values obtained in the above-described steps.

(FIG. 7: Step S104 to S123: Supplements)

These steps correspond to a computation block described in FIGS. 4A and 4B.

The following describes exemplary operation of controlling ignition timing IGN, intake valve closing timing IVC, a piston stroke PS, and exhaust valve closing timing EVC, using the target ignition timing TRGIGN, target intake valve closing timing TRGIVC, target piston stroke TRGPS, and target exhaust valve closing timing TRGEVC, respectively, which are obtained according to the flowchart described in FIG. 7.

Figure 8:
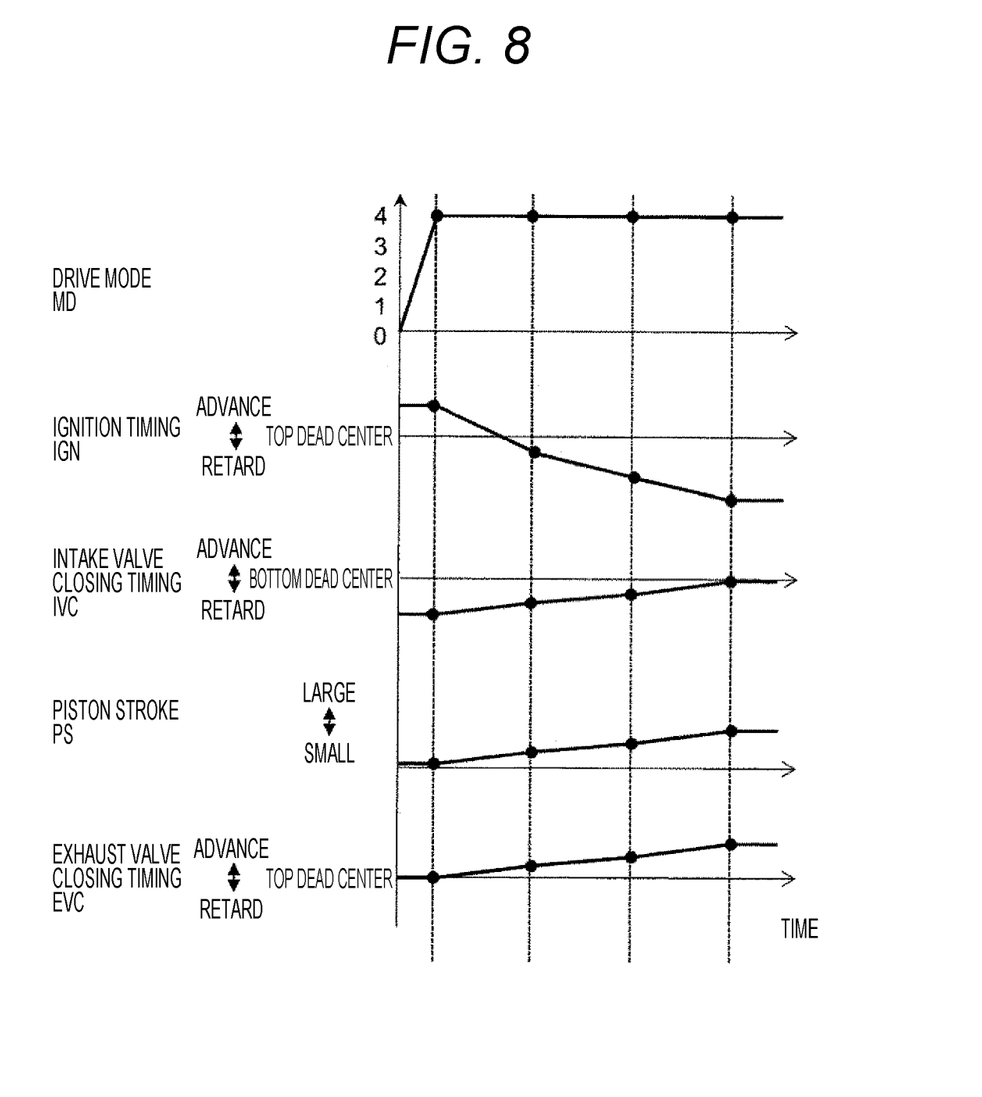
FIG. 8 is a time chart showing changes over time in each signal value for the case of the drive mode MD=4.

FIG. 8 is a time chart showing changes over time in each signal value for the case of the drive mode MD=4. An initial set value of the ignition timing IGN is more on the advance side than top dead center. When the drive mode MD is changed to 4, the amount of retard of the ignition timing IGN with respect to top dead center increases, the intake valve closing timing IVC approaches bottom dead center, and the piston stroke PS increases. By this, a reduction in the temperature in the combustion chamber 17 caused by the increase in the amount of retard of the ignition timing IGN can be improved by an increase in the actual compression ratio. Namely, the exhaust temperature is increased, by which the catalyst is activated and PM/PN can be reduced. Furthermore, by moving the exhaust valve closing timing EVC away from top dead center, the expansion ratio is reduced and the scavenging properties of residue gas in the combustion chamber 17 are improved, enabling to increase a negative pressure generated by the engine. Although in FIG. 8 the exhaust valve closing timing EVC moves away in an advance direction from top dead center, the configuration is not limited thereto, and the exhaust valve closing timing EVC may move away toward the retard side from top dead center.

Figure 9:
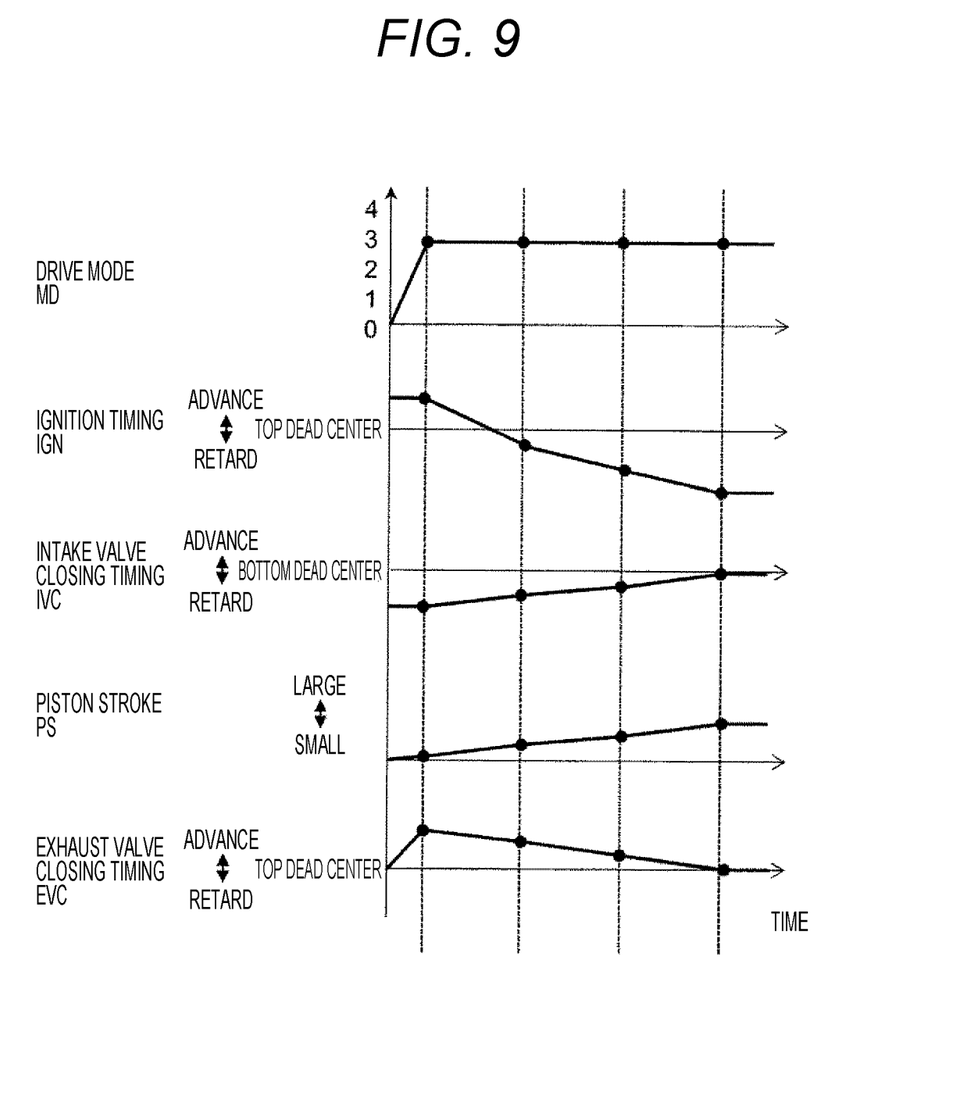
FIG. 9 is a time chart showing changes over time in each signal value for the case of the drive mode MD=3.

FIG. 9 is a time chart showing changes over time in each signal value for the case of the drive mode MD=3. An initial set value of the ignition timing IGN is more on the advance side than top dead center. When the drive mode MD is changed to 3, the amount of retard of the ignition timing IGN with respect to top dead center increases, the intake valve closing timing IVC approaches bottom dead center, and the piston stroke PS increases. By this, a reduction in the temperature in the combustion chamber 17 caused by the increase in the amount of retard of the ignition timing IGN is improved by an increase in the actual compression ratio, and the exhaust temperature is increased, by which the catalyst is activated and PM/PN can be reduced. Furthermore, since the exhaust valve closing timing EVC is brought close to top dead center based on the BaseEVC map, the thermal efficiency of the engine can be improved by an increase in the expansion ratio.

Figure 10:
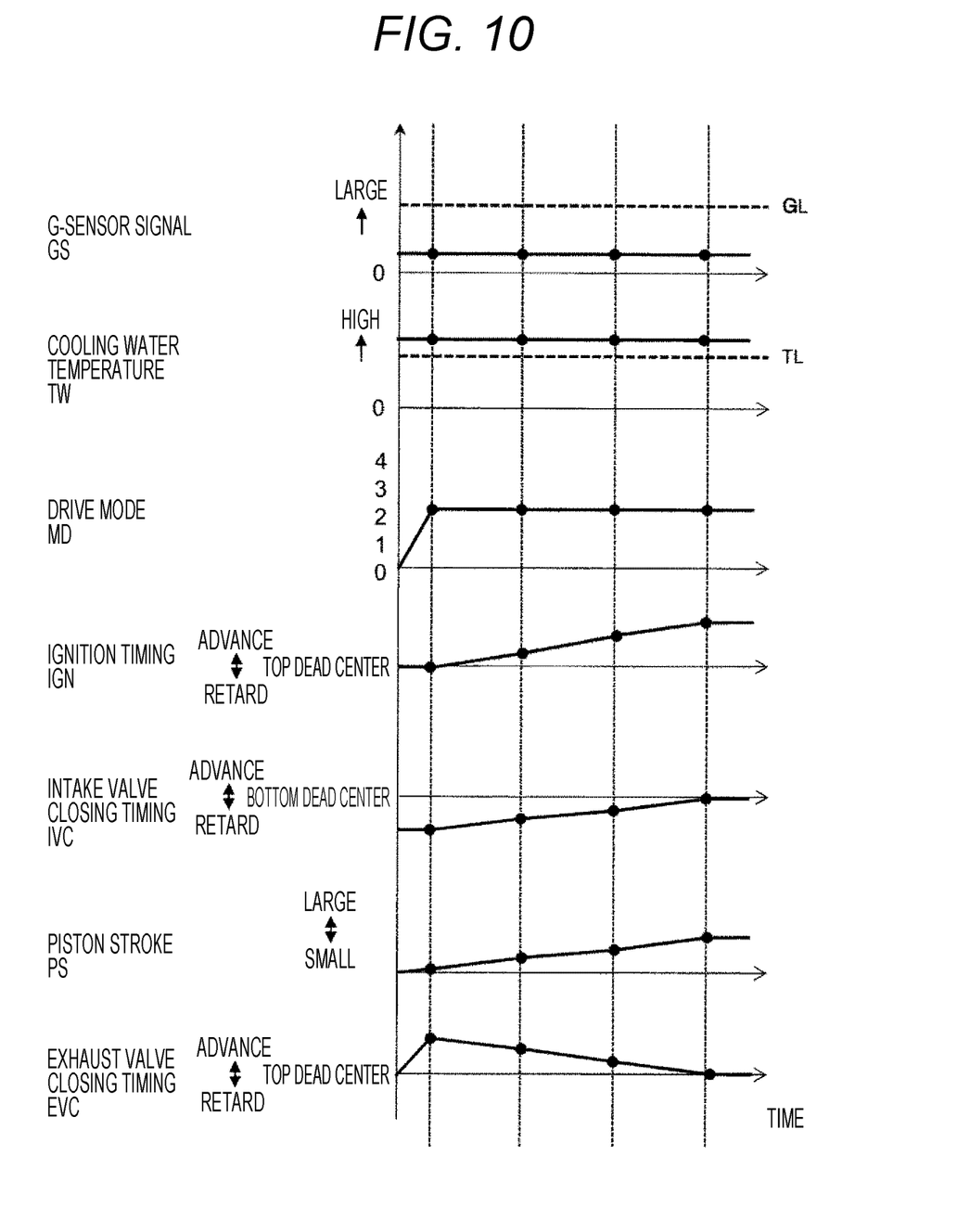
FIG. 10 is a time chart showing changes over time in each signal value for the case of the drive mode MD=2.

FIG. 10 is a time chart showing changes over time in each signal value for the case of the drive mode MD=2. The case of the drive mode MD=1 is also the same and thus description thereof is omitted. In FIG. 10, the G-sensor signal GS is less than or equal to the G-sensor signal limit GL and the cooling water temperature TW is higher than the cooling water temperature limit TL, and thus, the drive mode MD is 2. The ignition timing IGN changes in a direction in which the amount of advance increases with respect to top dead center from an initial set value, based on the BaseIGN map. The intake valve closing timing IVC approaches bottom dead center, based on the BaseIVC map. The piston stroke PS increases based on the BasePS map. By this, an increase in the temperature in the combustion chamber 17 and an increase in the actual compression ratio due to the increase in the amount of advance of the ignition timing IGN are simultaneously performed, enabling to improve the thermal efficiency of the engine 100. Furthermore, since an effect of improving combustion speed and an effect of stabilizing combustion upon EGR combustion using the EGR valve 26 and upon lean burn using the air-fuel ratio sensor 25 can be obtained, the thermal efficiency further improves. Since the exhaust valve closing timing EVC approaches top dead center based on the BaseEVC map, an improvement in the thermal efficiency of the engine due to an increase in the expansion ratio can be obtained.

<For Variants of the Present Invention>

The present invention is not limited to the above-described implementation example and includes various variants. For example, the above-described implementation example is described in detail to describe the present invention in an easy to understand manner, and thus, the present invention is not necessarily limited to one including all configurations described.

In the above-described embodiment, devices such as sensors and disposition positions are an example, and other devices and other disposition positions can also be adopted as long as they can exert the same functions.

Although the above-described embodiment exemplifies signals that are inputted to and outputted from the ECU 1, the ECU 1 can also accept as input and output other signals according to, for example, the configurations of sensors and other devices included in the engine 100.

Although the above-described embodiment describes that different control maps are selected according to the value of a drive mode MD, other means may be used provided that control values appropriate to a drive mode MD can be obtained. For example, by changing a control model according to the value of a drive mode MD, the same effects can be exerted.

Although the above-described embodiment describes that the actual compression ratio RCR is controlled by controlling the stroke of the piston 13 and the opening/closing timing of the variable valves 12, if the actual compression ratio RCR can be sufficiently controlled using only either one of them, then the same effects as those of the above-described embodiment can be exerted using only the either one.

Some or all of the above-described configurations, functions, processing units, processing means, etc., may be implemented by hardware by, for example, designing them as an integrated circuit. In addition, the above-described configurations, functions, etc., maybe implemented by software by a processor interpreting and executing a program that implements each function. Information such as the program that implements each function, tables, and files can be stored in a recording device such as a memory, a hard disk, or a solid state drive (SSD), or a recording medium such as an IC card, an SD card, or a DVD.

<Summary of the Present Invention>

The engine 100 according to the present invention includes the variable valves 12 and mechanisms (the crankshaft 14, the control shaft 31, etc.) for making the stroke of the piston 13 variable. The ECU 1 according to the present invention synchronously controls the ignition timing IGN and the actual compression ratio RCR when performing the catalyst warm-up mode. By controlling the ignition timing IGN, the exhaust temperature is controlled to promote catalyst activation, and by controlling the actual compression ratio RCR, the temperature in the combustion chamber 17 is controlled, enabling to suppress PM/PN.

Upon performing the catalyst warm-up mode, the ECU 1 according to the present invention increases the amount of retard of the ignition timing IGN with respect to top dead center, along with which the ECU 1 increases the actual compression ratio RCR. By this, while the temperature of the catalyst is increased by retarding the ignition timing IGN, a reduction in the temperature in the combustion chamber 17 can be suppressed.

The ECU 1 according to the present invention controls the actual compression ratio RCR by variably controlling the opening/closing timing of the variable valves 12, or controls the actual compression ratio RCR by variably controlling the stroke of the piston 13. By this, two or more means for controlling the actual compression ratio RCR can be provided.

The ECU 1 according to the present invention controls the actual compression ratio RCR by bringing the intake valve closing timing of the variable valves 12 close to bottom dead center, or controls the actual compression ratio RCR by increasing the stroke of the piston 13. By this, the temperature in the combustion chamber 17 is increased, enabling to reduce PM/PN.

The ECU 1 according to the present invention increases the actual compression ratio RCR for when the catalyst warm-up mode is performed, compared with an actual compression ratio for when the engine 100 is stopped or an actual compression ratio for when the engine 100 is completely exploded. By this, there is no need to perform unnecessary variable valve control and piston stroke control during a period from when the engine 100 is stopped until the engine 100 is completely exploded. Accordingly, energy required to move actuators for these controls can be saved.

After the catalyst warm-up mode is completed or when the temperature of the engine 100 is higher than or equal to a predetermined value (TW>TL in the example of FIG. 3B), the ECU 1 according to the present invention increases the actual compression ratio RCR according to an increase in the amount of advance of the ignition timing IGN with respect to top dead center. By this, the temperature in the combustion chamber 17 is increased to increase the thermal efficiency of the engine 100, enabling to improve fuel efficiency.

An automobile having mounted thereon the engine 100 according to the present invention includes the G-sensor 32 that measures the inclination angle of the automobile with respect to a road surface. When the inclination angle of the automobile is greater than or equal to a predetermined value, upon performing the catalyst warm-up mode, the ECU 1 increases the amount of retard of the ignition timing IGN with respect to top dead center, along with which the ECU 1 brings the intake valve closing timing of the variable valves 12 close to bottom dead center and moves the exhaust valve closing timing of the variable valves 12 away from top dead center. By this, when the inclination angle of the automobile is large and a large negative pressure is required for the braking system, by moving the exhaust valve closing timing away from top dead center, the scavenging properties of residue gas in the combustion chamber 17 are improved, enabling to increase a negative pressure generated by the engine 100. Accordingly, an increase in the temperature of the catalyst and suppression of PM/PN by the catalyst warm-up mode are achieved, and a negative pressure used by the braking system can be secured.

REFERENCE SIGNS LIST

1 ECU
2 accelerator pedal position sensor
3 air flow sensor
4 intake air temperature and humidity sensor
5 throttle
6 tumble flap
7 injector
8 fuel pump
9 common rail
10 fuel pipe
11 intake manifold
12 variable valve
13 piston
14 crankshaft
15 crank angle sensor
16 knock sensor
17 combustion chamber
18 cooling water temperature sensor
19 ignition plug
20 ignition coil
21 pressure sensor (or ion current sensor)
22 exhaust manifold
23 three-way catalyst
24 exhaust temperature sensor
25 air-fuel ratio sensor
26 EGR valve
27 EGR cooler
28 exhaust recirculation pipe
29 cooling water pump
30 cooling water passage switching valve
31 control shaft
32 G-sensor
100 engine

The invention claimed is:

1. An apparatus that controls an engine including variable valves or including a mechanism for making a piston stroke variable, comprising:
an engine control device that includes programing which when executed performs a catalyst warm-up mode that activates a catalyst, the catalyst cleaning up exhaust of the engine, wherein
the engine control device also includes programing which when executed synchronously controls ignition timing of the engine and an actual compression ratio of the engine for when the catalyst warm-up mode is performed, and
when the catalyst warm-up mode is completed or when a temperature of the engine is greater than or equal to a predetermined value, the actual compression ratio is increased as an amount of advancing the ignition timing relative to a top dead center of the engine increases.

2. The apparatus according to claim 1, wherein the engine control device also includes programing which when executed increases an amount of retard of the ignition timing with respect to top dead center of the engine and increases the actual compression ratio, when performing the catalyst warm-up mode.

3. The apparatus according to claim 1, wherein the engine control device controls the actual compression ratio by variably controlling opening/closing timing of the variable valves, or controls the actual compression ratio by variably controlling the piston stroke.

4. The apparatus according to claim 1, wherein the engine control device also includes programing which when executed controls the actual compression ratio by bringing intake valve closing timing of the variable valves to bottom dead center of the engine, or controls the actual compression ratio by increasing the piston stroke.

5. The apparatus according to claim 1, wherein the engine control device also includes programing which when executed increases the actual compression ratio for when the catalyst warm-up mode is performed, compared with an actual compression ratio for when the engine is stopped or an actual compression ratio for when the engine is combusted.

6. The apparatus according to claim 1, wherein
the apparatus controls an engine including variable valves,
the engine control device also includes programing which when executed obtains, from a sensor that measures an inclination angle of an automobile with respect to a road surface, the inclination angle, the engine being mounted on the automobile, and
when the inclination angle is greater than or equal to a predetermined value, upon performing the catalyst warm-up mode, the engine control device increases an amount of retard of the ignition timing with respect to top dead center of the engine, brings intake valve closing timing of the variable valves to bottom dead center of the engine, and moves exhaust valve closing timing of the variable valves away from top dead center of the engine.

* * * * *